(12) United States Patent
Liu et al.

(10) Patent No.: US 11,748,231 B2
(45) Date of Patent: Sep. 5, 2023

(54) MACHINE LOGIC FOR PERFORMING ANOMALY DETECTION

(71) Applicant: International Business Machines Corporation, Armonk, NY (US)

(72) Inventors: Wei Liu, Beijing (CN); Guo Ran Sun, Beijing (CN); Xiao Jing Wang, Beijing (CN); Dong Ying Jiao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 17/347,975

(22) Filed: Jun. 15, 2021

(65) Prior Publication Data

US 2022/0398182 A1 Dec. 15, 2022

(51) Int. Cl.
*G06F 11/34* (2006.01)
*G06N 20/00* (2019.01)

(52) U.S. Cl.
CPC ...... *G06F 11/3452* (2013.01); *G06F 11/3419* (2013.01); *G06N 20/00* (2019.01)

(58) Field of Classification Search
CPC ............. G06F 11/0751; G06F 11/3006; G06F 11/3409; G06F 11/3419; G06F 11/3447; G06F 11/3452; G06N 20/00
USPC ......................................................... 702/179
See application file for complete search history.

(56) References Cited

U.S. PATENT DOCUMENTS

| | | | |
|---|---|---|---|
| 10,437,831 B2 * | 10/2019 | De-Levie | G06F 16/285 |
| 2017/0124502 A1 | 5/2017 | Brew | |
| 2018/0100784 A1 | 4/2018 | Patil | |
| 2018/0302423 A1 * | 10/2018 | Muddu | G06F 40/134 |

OTHER PUBLICATIONS

"A Real-Time Performance Anomaly Detection Method Based on Machine Learning", An IP.com Prior Art Database Technical Disclosure, Authors et. al.: Disclosed Anonymously, IP.com No. IPCOM000263970D, IP.com Electronic Publication Date: Oct. 28, 2020, 4 pages.
Glen, Stephanie, "Correlation in Statistics: Correlation Analysis Explained" From StatisticsHowTo.com: Elementary Statistics for the rest of us!, Jan. 26, 2021, 7 pages, <https://www.statisticshowto.com/probability-and-statistics/correlation-analysis/>.
Laptev et al., "An Extensible Generic Anomaly Detection System", An IP.com Prior Art Database Technical Disclosure, IP.com No. IPCOM000256987D, IP.com Electronic Publication Date: Jan. 10, 2019, Copyright: Yahoo! 2019. All rights reserved, 6 pages.
Zoppi et al., "MADneSs: a Multi-layer Anomaly Detection Framework for Complex Dynamic Systems", IEEE Transactions on Dependable and Secure Computing, Manuscript ID, DOI:10.1109/TDSC.2019.2908366, IEEE Transactions on Dependable and Secure Computing, May 30, 2019, 14 pages.

* cited by examiner

*Primary Examiner* — John H Le
(74) *Attorney, Agent, or Firm* — David B. Woycechowsky (57) ABSTRACT

Technology for computerized anomaly detection, where the machine logic (for example, software) utilizes a multi-layer anomaly detection method that may include three (3) layers: (a) a baseline model for each feature at a single point, (b) a dynamic time window for historical data, and/or (c) correlation analysis for different model features.

15 Claims, 3 Drawing Sheets

INDUSTRIAL OVEN ANOMALY REPORT

THIS ANOMALY REPORT APPLIES TO
THE TIME WINDOW BETWEEN T1 AND T2.

OUR ANALYSIS IS THAT THERE WAS NO
ANOMALY AT THAT TIME.

NO FURTHER ACTION IS REQUIRED.

FIG. 4

MACHINE LOGIC FOR PERFORMING ANOMALY DETECTION

BACKGROUND

The present invention relates generally to the field of machine logic for performing anomaly detection.

As the term is used in this document, "layer" is defined as a general term used to indicate that a piece of machine logic (for example, a software program) performs multiple steps to compute a final result, and each layer is closely connected with the subsequent layer. For example, if a word processing program receives a piece of text and then spell checks that piece of text then the word processing program has: (i) a text receiving layer; and (ii) a spellchecking layer. In this simple example drawn from currently conventional technology, these steps are closely connected because there can be no spellcheck on the received text until the received text has been received.

As of 7 Mar. 2021, the Wikipedia entry for "anomaly detection" states in part as follows: "In data analysis, anomaly detection (also outlier detection) is the identification of rare items, events or observations which raise suspicions by differing significantly from the majority of the data. Typically, the anomalous items will translate to some kind of problem such as bank fraud, a structural defect, medical problems or errors in a text. Anomalies are also referred to as outliers, novelties, noise, deviations and exceptions. In particular, in the context of abuse and network intrusion detection, the interesting objects are often not rare objects, but unexpected bursts in activity. This pattern does not adhere to the common statistical definition of an outlier as a rare object, and many outlier detection methods (in particular unsupervised methods) will fail on such data, unless it has been aggregated appropriately. Instead, a cluster analysis algorithm may be able to detect the micro clusters formed by these patterns. Three broad categories of anomaly detection techniques exist. Unsupervised anomaly detection techniques detect anomalies in an unlabeled test data set under the assumption that the majority of the instances in the data set are normal by looking for instances that seem to fit least to the remainder of the data set. Supervised anomaly detection techniques require a data set that has been labeled as 'normal' and 'abnormal' and involves training a classifier (the key difference to many other statistical classification problems is the inherent unbalanced nature of outlier detection). Semi-supervised anomaly detection techniques construct a model representing normal behavior from a given normal monitoring data set, and then test the likelihood of a test instance to be generated by the learnt model."

In traditional anomaly detection, it is known to use a "baseline model" for detected feature values (also sometimes herein referred to as a parameter) at a single point in time. The baseline model takes the form of a set of machine logic based (for example, software based) rules for determining whether the feature values being observed in the observed system, at a given instant in time, indicate an anomaly. For example, one such rule might be, for example, that an anomaly is indicated if a temperature parameter value in the observed system is not between T1 and T2. Another such rule might be that if the temperature parameter value in the observed system is over temperature T3 (with T1<T3<T2) for longer than 10 minutes than an anomaly is indicated. Another example of such a rule is: if the pH value of the admixture in the vat is acidic and the humidity inside the vat is greater than H1, then an anomaly is detected. In other words, a rule of a baseline model can involve multiple feature values and/or rules that depend upon time as well as feature value(s).

"Correlation analysis" is a known technique that is conventionally performed on computers. As the term is used herein, "correlation analysis" is any set of computations designed to test relationships between quantitative variables and/or categorical variables. Correlation analysis determines a measure of a degree, if any, to which two, or more, features are related for purposes of detecting anomalies in the observed system. This measure is typically a numerical measure and is called a correlation coefficient. Correlation analysis is conventionally used in machine learning to help detect correlations in the data of the observed system that are received over time as the observed system is observed. The most common correlation coefficient is the Pearson Correlation Coefficient, which can be used to detect linear relationships existing among and between multiple parameters of the observed system.

SUMMARY

According to an aspect of the present invention, there is a method, computer program product and/or system that performs the following operations (not necessarily in the following order): (i) receiving an input data set including information indicative of a plurality of monitoring data sets which may be used to train machine learning algorithms, with each monitoring data set including a plurality of feature values respectively corresponding to a plurality of features, where each feature corresponds to a parameter that is used to characterize some aspect of a situation that has occurred, and with one of the features being a date/time feature corresponding to when the feature values of the monitoring data set were detected and/or generated; (ii) creating a plurality of baseline models respectively corresponding to the plurality of features, with each baseline model being associated with a single point; and (iii) applying the plurality of baseline models to calculate a score for each feature at each single point to obtain a plurality of scores.

DETAILED DESCRIPTION

Some embodiments are directed to computerized anomaly detection, where the machine logic (for example, software) utilizes a multi-layer anomaly detection method that may include three (3) layers: (a) a baseline model for each feature at a single point, (b) a dynamic time window for historical data, and/or (c) correlation analysis for different model features. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
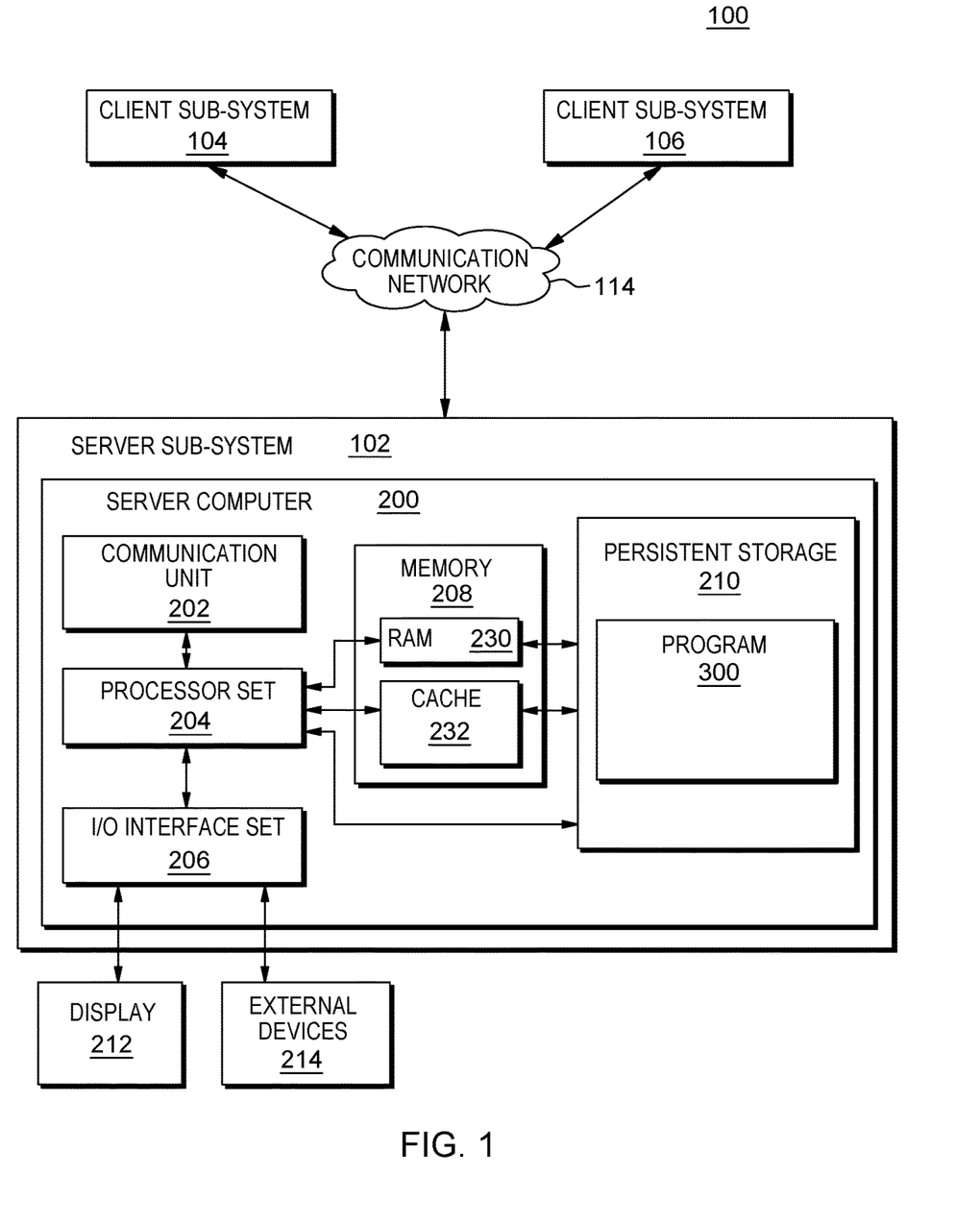
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
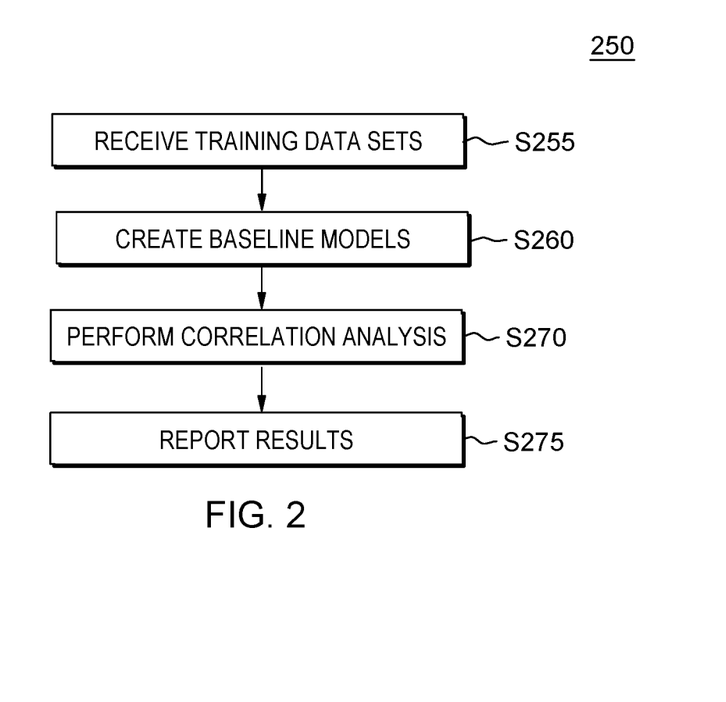
FIG. 2 is a flowchart showing a first embodiment method performed, at least in part, by the first embodiment system.
Figure 3:
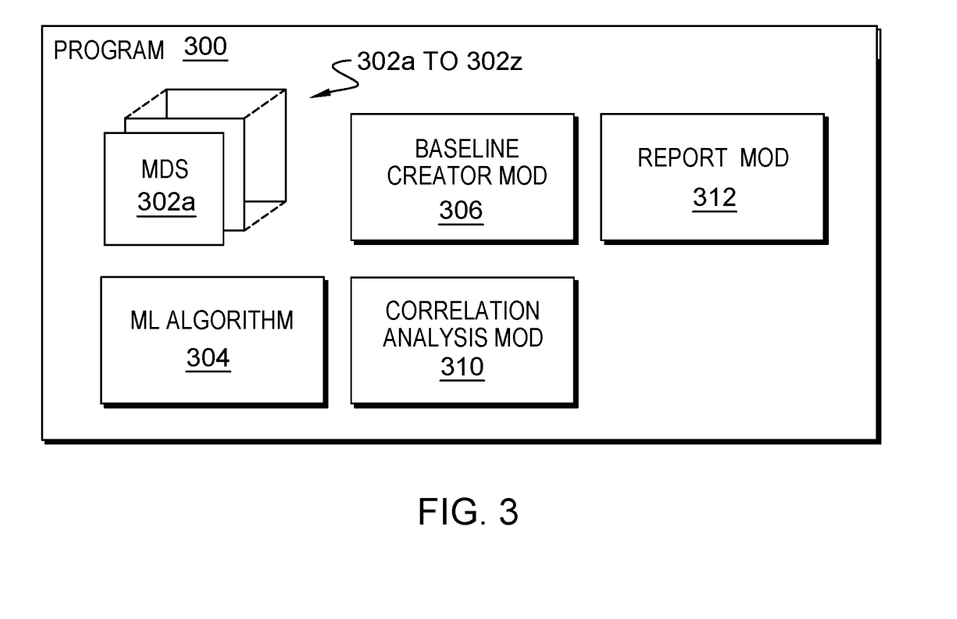
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Prior to the start of the method of flowchart 250, baseline models for features are trained using historical data and form the normal range (for example, an upper value and a lower value) at each time point (let's call these models M1s). In order to reduce noisy data, period-based baseline models are built as follows: (i) apply a clustering algorithm to the historical data to obtain a set of periods for each feature which have similar behaviors; and (ii) build new baseline models based on metrics collected from each period. A period is a range of time points in which metrics have a consistent pattern, comparing to other periods. For each feature, each period has a baseline model and time points in the same period and share the same baseline (let's call these models M2s).

Processing begins at operation S255, where program 300 receives, from client sub-system 104 (also called monitoring sub-system 104) and through network 114, a set of monitoring data sets (MDSs) 302a to 302z. Each monitoring data set includes: (i) a date/time stamp (sometimes herein more simply referred to as a "timestamp") that reflects the time at which the MDS was obtained by monitoring; and (ii) a set of feature values respectively corresponding to a predetermined set of features. Each feature corresponds to a parameter that is used to characterize some aspect of a situation that is being monitored.

In a simple example corresponding to the method of flowchart 250, the situation that is being monitored, by monitoring sub-system 104, is the baking of cakes in an industrial oven. In this simple example, there are three (3) feature values in each MDS 302a to 302z, respectively corresponding to the following three(s) parameters being monitored: (i) oven temperature; (ii) reflectivity of a surface of a cake; and (iii) cake thickness. As will be explained below, it is desired to know whether feature values of the twenty-six (26) MDSs indicate any sort of anomaly that might be occurring in the environment of the industrial oven and/or the monitoring equipment of monitoring sub-system 104.

Processing proceeds to operation S260, where baseline model creator module ("mod") 306 creates a baseline model for each of the three (3) features that is monitored by MDSs 302a to 302z (that is, temperature, reflectivity and thickness).

More specifically, the baseline model for temperature, that is the baseline model M1 is applied to the temperature value monitored to obtain a score S1. The higher the temperature value deviation with the baseline, the lower the score. In this highly simplified example, if the temperature value exceeds the range, then a negative score (<50) is computed. It is noted that in most practical, real world examples, the algorithm to compute the score is more complicated than a simple comparison against a threshold value.

The baseline model for thickness calculates and/or determines a score S1 for the thickness feature at each timestamp.

The baseline model for reflectivity calculates and/or determines a score S1 for the reflectivity feature at each timestamp. This is similar to the computations used to obtain the score of temperature, as discussed above.

Each of these three (3) baseline models is "associated with a single point." What this means is that: the baseline model (M1) of each feature built the normal range (an upper value and a lower value) by time point. For example, at 05:00, the normal range of temperature is 20 degree to 30 degree, the normal range of thickness is 5 cm to 10 cm, the normal range of reflectivity is 30% to 40%; and at 05:01, the normal range of temperature is 25 degree to 35 degree, the normal range of thickness is 8 cm to 12 cm, the normal range of reflectivity is 10% to 30%.

In operation S260 mod 306 also adjusts the score S1 to a more accurate score in order to reduce false alarm.

Processing proceeds to operation S270, for each given feature value of each monitoring data set, correlation analysis mod 310 performs correlation analysis for all 26 data sets. Correlation analysis is performed on all data sets. By applying correlation analysis, it groups features into different groups. For example, temperature and thickness are in one group G1, and reflectivity is in another group G2. By mathematically averaging the scores (S1" calculated from 0040) of features in one group, the score of each group is obtained. Then the final anomaly status of the system is calculated based on scores of these groups.

The correlation analysis for this simple example will now be discussed. The three (3) pertinent features (temperature, thickness and reflectivity) of the system are grouped into 3 groups (from G1 to G3) using above methods.

In this simple example, each group corresponds to a single feature as follows: (i) G1=F1=temperature value; (ii) G2=F2=reflectivity value; and (iii) G3=F3=thickness value. It is noted that in most embodiments of the present invention, at least most of the groups will have more than one feature. For example, a typical group may include 100 features, or more. Each feature has a score that is obtained by applying the baseline model created, at operation S260, to the feature values. Because performance of features in the same group should be similar, a machine learning algorithm (see machine learning algorithm 304) is used to remove the potential spikes of certain features to make the score of the group more accurate. After that, by mathematically averaging the scores of the remaining features, the scores for the groups are obtained. In this simple example: (i) temperature: score for G1=38; (ii) reflectivity: score for G2=49; and (iii) thickness: score for G3=75. Then correlation analysis mod 310 calculates the final anomaly status of the system based on the scores for G1, G2 and G3. In this example, this correlation analysis mod 310 uses a weighted average, or other algorithm, and smaller scores have more weight. In this simple example, the weights for each group are all equal to 1. The final score of the system calculated is 54. The threshold for reporting an anomaly in the operations of the industrial oven is 50.

Figure 4:
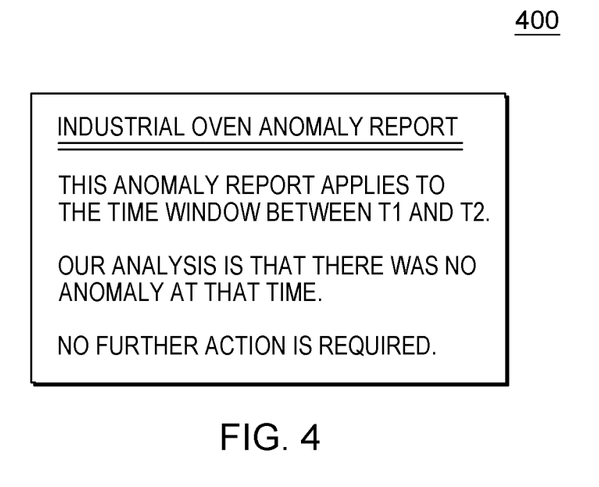
FIG. 4 is a screenshot view generated by the first embodiment system.

Processing proceeds to operation S275, where report mod 312 (because the system score of 54 is greater than the threshold of 50) communicates that no anomaly is present in this simple example. More specifically, an electronic communication is sent from report mod 312 to client sub-system 106 (that is, a baker's smartphone). This communication is shown at screenshot 400 of FIG. 4.

III. Further Comments and/or Embodiments

Some embodiments of the present invention recognize the following facts, potential problems and/or potential areas for improvement with respect to the current state of the art: (i) anomaly detection methods and systems are widely used in various areas, such as computer science, medicine, and climate fields; (ii) commonly, there are two ways to detect anomalies and both have some weaknesses including: (a) a single point negative anomaly in a baseline model may cause too many false alarms, especially when it has a large number of features in a machine learning model, (b) applying fixed statistics filters on the original baseline model (for example, when the duration of the negative point is larger than a fixed time, it will be regarded as an anomaly) will avoid some false alarms, but it is not flexible, and/or (c) true anomalies may be missed in some cases (for example, a single point anomaly); and/or (ii) a better way to detect anomalies utilizing more intelligence and higher accuracy needs to be found.

Some embodiments of the present invention recognize the following facts, potential problems and/or potential areas for improvement with respect to the current state of the art: (i) in monitoring systems, customers need to have anomalies detected accurately and as early as possible; (ii) it is difficult to define rules as to when to report an anomaly; (iii) currently, the way to report anomalies are: (a) regarding/referencing a single point negative anomaly will cause false alarms (for example, if there is noise (a KPI (key performance indicator) goes beyond normal range but quickly returns to normal), and/or (b) applying static filters (for example, only when five (5) continuous negative points is regarded as an anomaly), this will avoid some false alarms, but it is not flexible; (iv) in some cases, anomalies are sometimes missed; and/or (v) there is a need to find a more intelligent method to more accurately detect anomalies.

Some embodiments of the present invention recognize the following facts, potential problems and/or potential areas for improvement with respect to the current state of the art: (i) the baseline model is trained based on machine learning algorithms using historical data collected from a production environment; (ii) after the model is trained and deployed, it can predict whether the real time performance of each feature is within a reasonable range; (iii) each feature at every single point will be scored with a value during 0-100 and score less than 50 is considered negative; (iv) the dynamic time windows are computed based on the historical data and accumulative time; (v) the baseline model is based on the data pattern and by applying the clustering algorithm to the historical data; (vi) finds a set of time windows for each feature which have similar behaviors; (vii) when computing anomaly status of one feature at a time point, the status of time points in the same historical time window will be used as input; (viii) for accumulative time, the time window will continue to increase until the status is: (a) computed as an anomaly, or (b) reaches a pre-determined threshold value; and/or (ix) severity of negative scores may be considered in this dynamic time window layer.

Some embodiments of the present invention recognize the following facts, potential problems and/or potential areas for improvement with respect to the current state of the art: (i) correlation analysis is used to test relationships between quantitative variables or categorical variables; (ii) correlation analysis or expert experience is used to cluster those features which have similar performance during a period; (iii) after clustering, some feature groups are obtained; (iv) after feature groups are obtained, a correlated score result is calculated for each group instead of only one particular feature, as these features are related, using the combined score results could avoid the potential bias of only one feature; and/or (v) in correlation analysis, the correlated score results of these feature groups are used to calculate the final system status to improve the anomaly detection and make it more accurate.

Some embodiments of the present invention recognize the following facts, potential problems and/or potential areas for improvement with respect to the current state of the art: (i) uses multiple layers to give more accurate and intelligent prediction, especially for a complex system which has thousands of features; (ii) using the baseline model in the first layer, a score (S1) is obtained for each feature at each time point; (iii) S1 is between 0-100, and bigger value means better performance; (iv) if the score is under a particular value, for example 50, this score is considered negative; and/or (v) uses period baseline and a dynamic time window to reduce false alarms and catch true anomalies.

Some embodiments of the present invention may include one, or more, of the following operations, features, characteristics and/or advantages: (i) utilizes a multi-layer anomaly detection method and system; (ii) the system contains three (3) layers: (a) a baseline model for each feature at a single point, (b) a dynamic time window for historical data, and/or (c) correlation analysis for different model features; and/or (iii) uses semi-supervised anomaly detection techniques to construct the models.

Some embodiments of the present invention include may include one, or more, of the following operations, features, characteristics and/or advantages with respect to key technical points pertaining to the three (3) layers described in the previous paragraph where layer one (1) includes a baseline model where each feature is trained based on historical data. In the baseline model, the deviations for each feature will be computed by the baseline model and the results will be normalized to a specific range (for example, 0 to 100, called a score value). If the score is under a particular value, for example fifty (50), then this score will be considered as negative.

In some embodiments of the present invention, layer two (2) performs the following functions: (i) accepts the score of each feature from the first layer, (ii) computes the anomaly status for each feature based on accumulative metrics during a dynamic time window and adjusts the score value of the first layer; (iii) computes the dynamic time windows based on the historical data and accumulative time, and (iv) applies the clustering algorithm to the historical data where a set of time windows for each feature, which have similar behaviors, can be found. When computing anomaly status of one feature at a time point, the status of time points in the same historical time window will be used as an input. For accumulative times, the time window will continue to increase until the status is computed as an anomaly or reaches a pre-defined threshold. The severity of negative scores will also be considered in layer two (2) (for example, a score of ten (10) is much more severe than a score of forty nine (49) and will be weighted differently). Layer two (2) will compute a new score for each feature.

In some embodiments of the present invention, layer three (3) operates as follows where different features may have similar behaviors. Correlation analysis (for example, using a clustering algorithm or some other machine learning algorithm) is applied for different model features using historical data. Model features can be grouped into different groups. The features in the same group will be considered as "related" features. The related features also can be inputted by experienced experts. For each related feature group, a relevancy model can be trained based on historical data to combine the input score values to an overall score value. Compared to a single-layer method, the three (3) layer anomaly detection system described above can reduce false alarms by 50% to 60% and capture more missing anomalies.

An embodiment of the present invention includes: (i) a baseline model for each feature at a single point; (ii) a dynamic time window for historical data; and (iii) correlation analysis for different model features.

Some embodiments of the present invention may include one, or more, of the following operations, features, characteristics and/or advantages: (i) utilizes a multi-layer anomaly detection system by using accumulative scores of a dynamic time window instead of a static filter; and/or (ii) since some KPIs are interrelated, the status of related KPIs will also be used as an input to compute the final anomaly status.

A multi-layer anomaly detection system according to an embodiment of the present invention includes the following three (3) layers: (i) a baseline model to score each KPI of the system, where the score is between 1 to 100, and a score less than 50 is considered negative; (ii) the score of each KPI is sent to the second layer, which will compute anomaly status for each KPI based on accumulative scores during a dynamic time window where in this layer, severity of negative scores will also be taken into account, and (iii) the output of the second layer is sent to the third layer, which will compute the final anomaly status using second layer output of the current KPI and its related KPIs.

In some embodiments of the present invention, the first layer, a baseline model, is trained based on historical data where real-time metrics collected for KPIs are sent to the model and scored where a score of less than 50 is considered negative.

In the second layer, some embodiments of the present invention compute the anomaly status for a KPI where two (2) factors are considered: (i) the severity of negative scores (for example, a score of ten (10) is much more severe than score of forty nine (49) and will be weighted differently), and (ii) includes accumulative scores during a dynamic time window where the dynamic time window is computed based on: (a) historical data, using a clustering algorithm, where windows which have similar performance can be found (for example, for KPI A, 3:05~4:05, 23:30~24:30 have similar performance, and they are considered as the same time window), (b) when computing anomaly status of a current KPI at a current time point, the status of the time points in the same historical time window will be used as input; and (c) accumulative time, where the time window will continue to increase until the status is computed as an anomaly or reaches a pre-defined threshold (for example, 20 minutes at maximum).

In the third layer, some embodiments of the present invention will compute the final anomaly status of the current KPI by combining the status of the current KPI and related KPIs. In this case, related KPIs are computed based on: (i) historical data, using a clustering algorithm where KPIs that have similar performance will be considered "related", and (ii) expert experience, where output of the historical data described above will be merged with related KPIs defined by experienced experts. Utilizing this multi-layer anomaly detection system, anomalies can be detected more accurately and intelligently.

Different embodiments of the present invention may use different correlation algorithms, now known or to be developed in the future.

Some embodiments of the present invention recognize the following facts, potential problems and/or potential areas for improvement with respect to the current state of the art: (i) a multi-layer anomaly detection method and system with 3 fixed-layers; (ii) each layer will focuses on the different perspective of the system and the post-layer needs the pre-layer's analysis result as the input; (iii) in Layer 1, a baseline model is used to calculate a score for each feature of the system; (iv) the scores may be scaled and/or normalized to be in the numerical range of 1 to 100, such that a score less than 50 is considered negative; (v) in Layer 2, the scores are received from the first layer; (vi) compute anomaly status for each feature based on accumulative scores during a dynamic time window; (vii) in this dynamic time window layer, severity of negative scores may also be considered; (viii) in Layer 3, based on the output of the second layer, final anomaly status is determined based upon 2nd-layer output of current features and its related features; and/or (ix) the identity of which features are related features, with respect to a given feature, is calculated by a correlation analysis algorithm and expert experience.

An embodiment of a method according to an embodiment of the present invention, will now be set forth in the following paragraphs:

FIRST OPERATION: By applying the clustering algorithm to the historical data, the machine logic can find a set of periods for each feature which have similar behaviors. For example, during 13:00~14:00 and 16:00~18:00, the behavior is similar, so they are regarded as the same period.

SECOND OPERATION: Build a new baseline model based on metrics collected from each period. Each period that has a baseline and time points in the same period share the same baseline. The baseline model is based on the data pattern and certain data distribution. With period taken into account in this step, the model can work better since there is less chance to have bias because of noisy data.

THIRD OPERATION: Using the new baseline model, the machine logic can get another score (S2) for each feature at each time point.

FOURTH OPERATION: By averaging S1 and S2, a more accurate score S1' for each feature can be obtained.

FIFTH OPERATION: If S1' is positive, the process ends and S1' will be the final output of this layer. On the other hand, if S1' is negative, a dynamic time window will be used to adjust S1' to S1", which will be the final output of this layer:

SIXTH OPERATION: A new round of a dynamic time window is initiated once a negative score is seen. It will continue to accumulate if the score of subsequent time point is still negative, and ends once the score of subsequent time point is positive. The machine logic will compute a severity factor 'M' according to the size of the dynamic time window. The initial value of the severity factor is 1 and it will decrease gradually with the accumulation of the dynamic time window. For example, the machine logic can use the following formula to compute M:

$$M = 1 - (n-1) * 0.02$$

Where n is the size of the dynamic time window. If n>50, M=0. Please note, the above method to compute M is just an example and needs to be adjusted manually according to the specific system.

By applying the severity factor to S F, the machine logic got a smaller S1", which means more severe:

$$S1'' = S1' * M$$

For example, for the 3rd time point of the time window, S1'=49, then S1"=47. With the above approach, the adjusted score can reflect the anomaly status more accurately and intelligently.

The computation of the final anomaly status using 2nd-layer output of the current feature and its related features will now be discussed. In a complex system, it may have thousands of features. Some of the features have similar tendency and these features will be called "related features." Related features can be grouped together. Therefore, all features of a system can be divided into multiple groups, and each group represents the performance of a certain dimension of the system.

In some embodiments, the following methods may be used to group related features: (i) applying the correlation analysis (clustering algorithm or other machine learning algorithm) on all model features using historical data; (ii) group the model features into different groups; (iii) use input from expert experience; and (iv) by grouping these features, the machine logic can get an overall performance of the system based on the performance of each group. In this way, the machine logic can improve the accuracy of anomaly detection and reduce false alarms.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
receiving current input data including a stream of first feature values corresponding to a first measured parameter that is used to characterize some aspect of an ongoing production process used to produce a product;
creating a first baseline model for the first feature, with the baseline model indicating data patterns indicated a normal range and a set of anomaly-indicative data patterns that indicates potential existence of an anomaly occurring in the ongoing production process;
applying the first baseline model to first feature values being received in the first stream of data values to tentatively determine an anomaly in the ongoing production process;
responsive to the tentative determination of the anomaly, locating a set of historical time period(s) when the stream of first feature values followed a similar pattern to the current input data; and
making a final determination that an anomaly is not occurring based, at least in part, on historical first feature data values from the set of historical time period(s).

2. The CIM of claim 1 wherein the product is a foodstuff.

3. The CIM of claim 2 wherein the first feature is temperature.

4. The CIM of claim 1 further comprising:
using a combination of single timepoint based model and period based modelwherein the first feature is reflectivity.

5. The CIM of claim 1 wherein the first feature is a physical dimension of instantiations of the product being produced.

6. A computer program product (CPP) comprising:
a set of storage device(s); and
non-transitory computer code stored collectively in the set of storage device(s), with the computer code including data and instructions to cause a processor(s) set to perform at least the following operations:
receiving current input data including a stream of first feature values corresponding to a first measured parameter that is used to characterize some aspect of an ongoing production process used to produce a product,
creating a first baseline model for the first feature, with the baseline model indicating data patterns indicated a normal range and a set of anomaly-indicative data patterns that indicates potential existence of an anomaly occurring in the ongoing production process,
applying the first baseline model to first feature values being received in the first stream of data values to tentatively determine an anomaly in the ongoing production process,
responsive to the tentative determination of the anomaly, locating a set of historical time period(s) when the stream of first feature values followed a similar pattern to the current input data, and
making a final determination that an anomaly is not occurring based, at least in part, on historical first feature data values from the set of historical time period(s).

7. The CPP of claim 6 wherein the product is a foodstuff.

8. The CPP of claim 7 wherein the first feature is temperature.

9. The CPP of claim 6 wherein the first feature is reflectivity.

10. The CPP of claim 6 wherein the first feature is a physical dimension of instantiations of the product being produced.

11. A computer system (CS) comprising:
a processor(s) set;
a set of storage device(s); and
computer code stored collectively in the set of storage device(s), with the computer code including data and instructions to cause the processor(s) set to perform at least the following operations:

receiving current input data including a stream of first feature values corresponding to a first measured parameter that is used to characterize some aspect of an ongoing production process used to produce a product, creating a first baseline model for the first feature, with the baseline model indicating data patterns indicated a normal range and a set of anomaly-indicative data patterns that indicates potential existence of an anomaly occurring in the ongoing production process, applying the first baseline model to first feature values being received in the first stream of data values to tentatively determine an anomaly in the ongoing production process, responsive to the tentative determination of the anomaly, locating a set of historical time period(s) when the stream of first feature values followed a similar pattern to the current input data, and making a final determination that an anomaly is not occurring based, at least in part, on historical first feature data values from the set of historical time period(s).

12. The CS of claim 11 wherein the product is a foodstuff.

13. The CS of claim 12 wherein the first feature is temperature.

14. The CS of claim 11 wherein the first feature is reflectivity.

15. The CS of claim 11 wherein the first feature is a physical dimension of instantiations of the product being produced.

\* \* \* \* \*